Oct. 6, 1970 D. D'EUSTACHIO 3,532,480
METHOD OF MAKING MULTICELLULAR GLASS
Filed Sept. 23, 1965
3 Sheets-Sheet 1
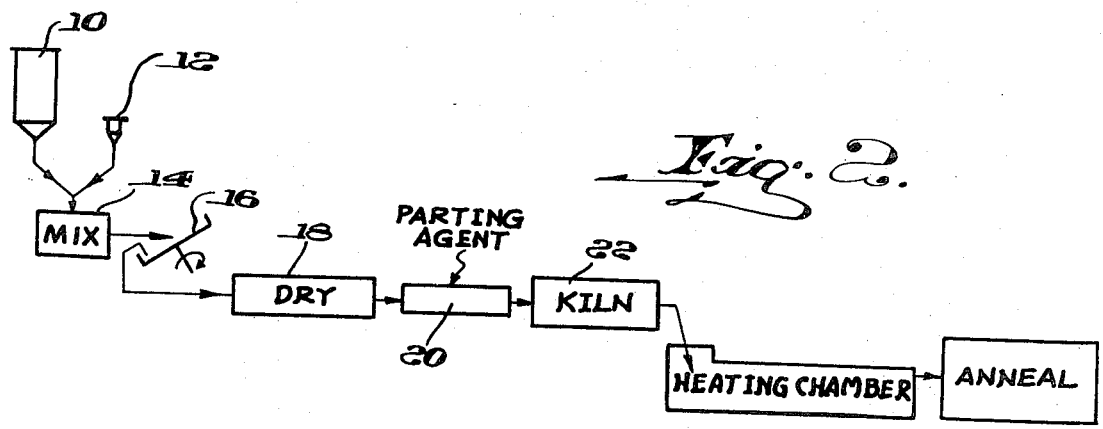
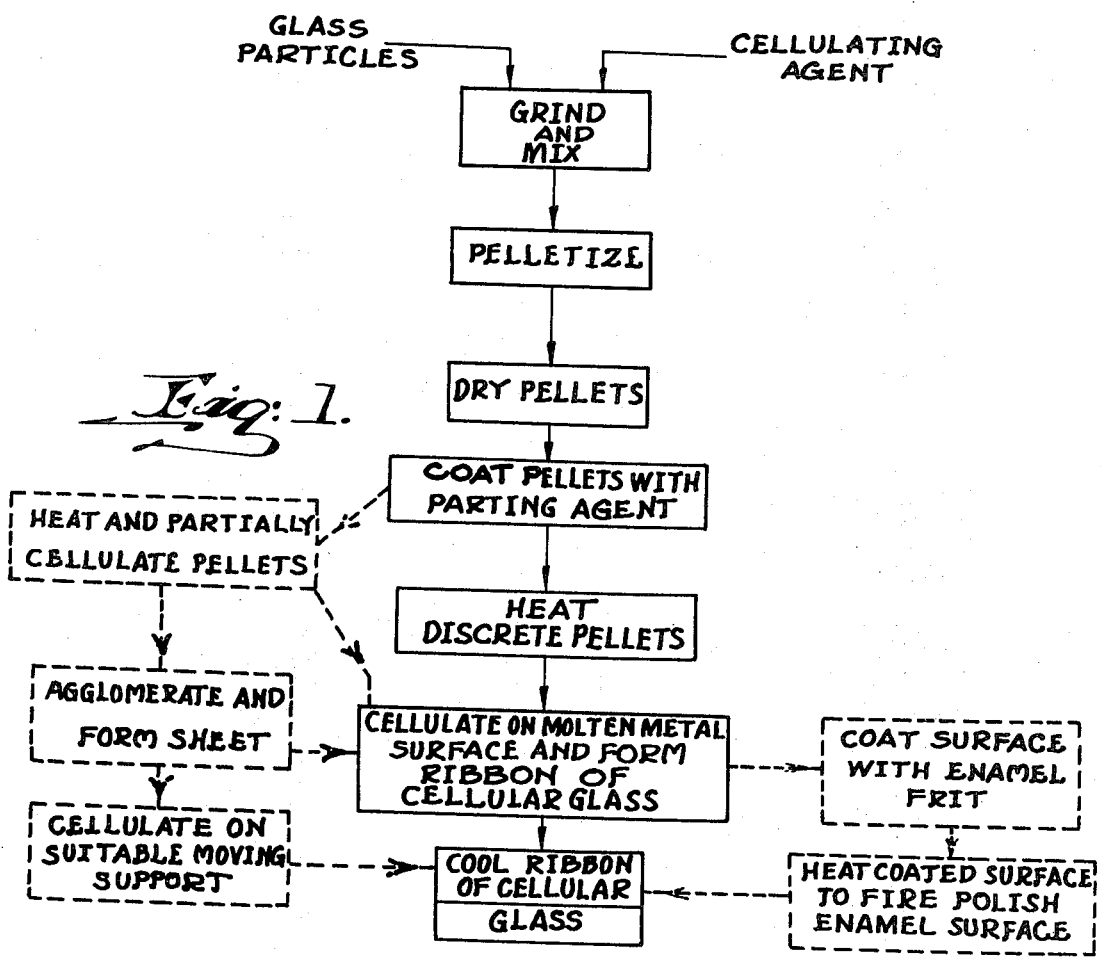
INVENTOR.
DOMINIC D'EUSTACHIO
BY
his ATTORNEY Oct. 6, 1970 D. D'EUSTACHIO 3,532,480
METHOD OF MAKING MULTICELLULAR GLASS
Filed Sept. 23, 1965 3 Sheets-Sheet 2
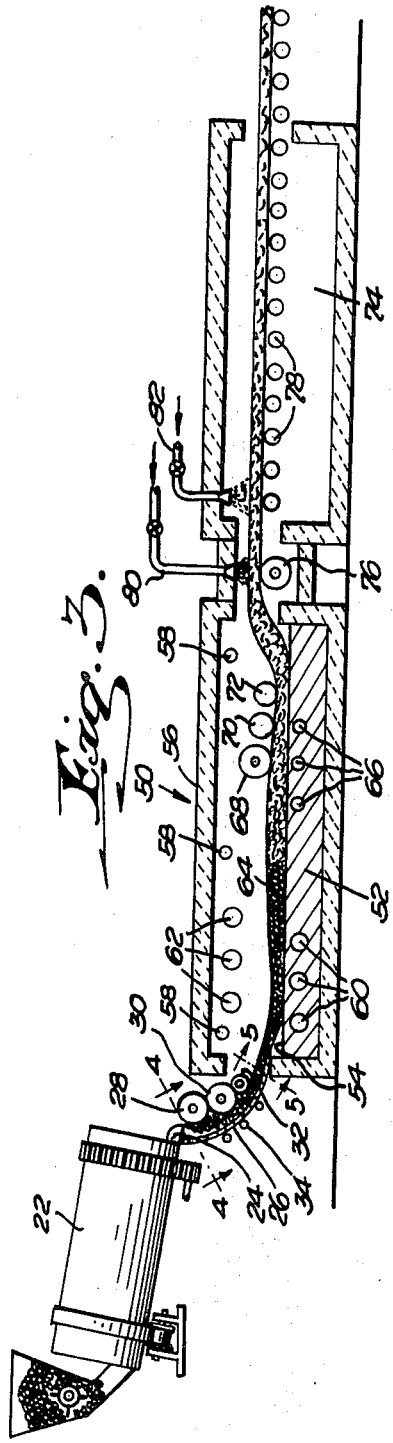
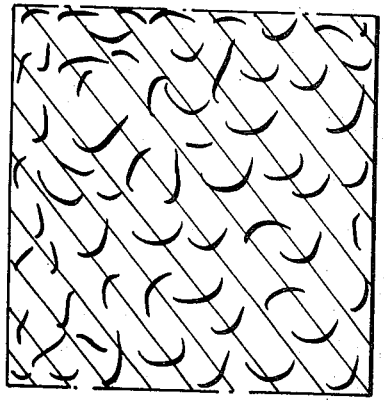
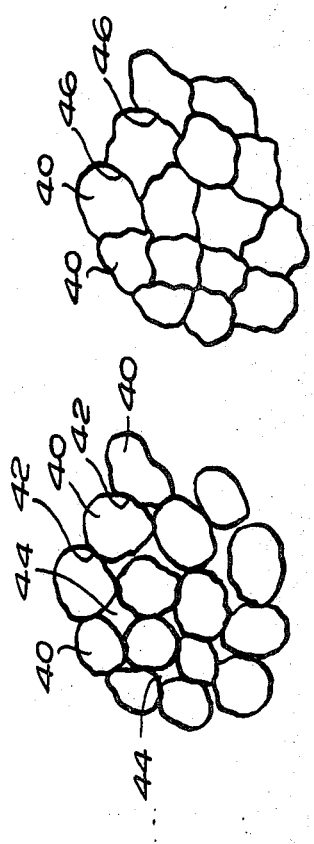
INVENTOR.
DOMINIC D'EUSTACHIO.
BY Stanley J Price
his ATTORNEY.

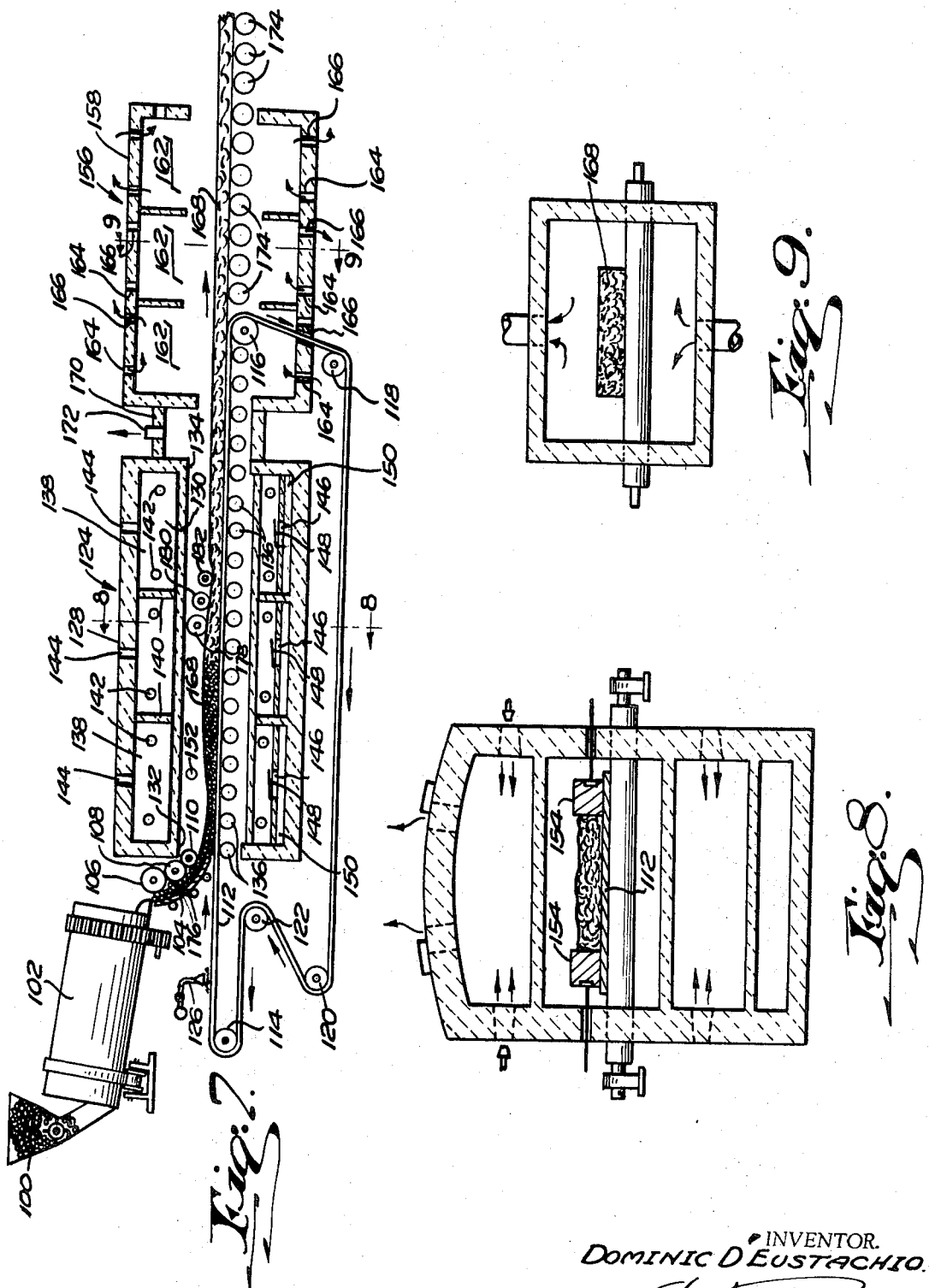

United States Patent Office 3,532,480
Patented Oct. 6, 1970

3,532,480
METHOD OF MAKING MULTICELLULAR GLASS
Dominic D'Eustachio, Pittsburgh, Pa., assignor to Pittsburgh Corning Corporation, Port Allegany, Pa., a corporation of Pennsylvania
Filed Sept. 23, 1965, Ser. No. 489,476
Int. Cl. C03b *19/08*
U.S. Cl. 65—20                                              10 Claims

ABSTRACT OF THE DISCLOSURE

This disclosure relates to a process for making a continuous sheet of cellular glass. Discrete pellets are formed of pulverulent glass and a cellulating agent. The discrete pellets are heated to an elevated temperature and while at this elevated temperature are agglomerated to form a continuous sheet. The sheet of agglomerated pellets is fed into a heating chamber where the mixture of pulverulent glass and cellulating agent softens and cellulates to form a continuous unitary sheet of impervious cellular glass. In one embodiment the pellets are heated for a sufficient period of time to partially cellulate and the partially cellulated pellets are thereafter formed into a sheet while at an elevated temperature.

---

This invention relates to an improved method of making multicellular glass and more particularly to a method of forming a cohered agglomerated mass of the constituents used to make multicellular glass and thereafter heating the agglomerated mass to cause the constituents to cellulate and form a body of multicellular glass.

There is disclosed in pending United States applications Ser. No. 363,485 entitled "Method of Making Multicellular Glass" now Pat. No. 3,288,584 and Ser. No. 363,517 entitled "Glass Product and Continuous Method of Making the Same" now Pat. No. 3,300,289, assigned to the assignee of the present invention, and in South Africa Pat. No. 645,959 entitled "Improvements in or relating to the Manufacture of Cellular Material," a process for making multicellular glass by continuously feeding a discrete powdery mixture of glass forming material and a cellulating agent onto a surface of a molten metal bath and heating the discrete powdery mixture thereon to cause it to soften, cohere and cellulate. It is stated with above described processes that a continuous ribbon or sheet of cellular glass is obtained. The hereinafter described process is an improvement on the above described process and now makes it possible to more economically produce in a continuous manner multicellular glass sheets of both desired thickness, density and other desirable physical properties. With one embodiment of the hereinafter described process the heat transfer requirements of the molten metal bath are substantially reduced and the mixture of glass forming material and cellulating agent is fed to the molten metal bath as a coalesced or cohering sheet, and in this manner the problem of transporting the material is solved.

Another embodiment of the hereinafter described process provides a moving support for the sheet for transporting the sheet through a heating chamber. The control problems of the continuous process are thereby simplified and it is, therefore, possible to more readily change the physical properties of the cellular glass product for many different uses. The apparent density and the compressive strength of the cellular glass product can be readily increased so that the cellular glass product has the desired compressive strength for use as a structural member of a building. The apparent density may be controlled to decrease the thermal conductivity of the cellular glass so that it may be more effectively used as an insulating material. The relative thickness of the sheet of multicellular glass may also be controlled to provide sheets of desired thickness.

Briefly, the herein described process comprises agglomerating the discrete powdery mixture of glass forming material and cellulating agent into pellets or the like, heating the pellets to an elevated temperature so that the pellets partially cellulate and thereafter are made to cohere to each other and form a sheet of coalesced, partially expanded pellets or nodules. The sheet of coalesced semi-expanded pellets at sufficiently elevated temperature to be plastic is thereafter fed into a heating chamber wherein the sheet of coalesced, partially expanded pellets further cellulates and forms a sheet of multicellular glass. The sheet of coalesced, partially expanded pellets may be supported in the heating chamber on a heated surface of a material nonwettable by molten glass or on a suitable moving support that transports the sheet through the heating chamber at a controlled rate. Where desired, the pellets may be heated to a temperature where the glass forming material just softens enough for the pellets to adhere to form a sheet of material that is then fed into the heating chamber where it is allowed to cellulate to the desired degree.

Accordingly, the principal object of this invention is to provide an improved continuous process for making cellular glass from agglomerates of the powdery constituents used in the manufacture of cellular glass.

Another object of this invention is to provide an improved continuous process for making cellular glass by agglomerating the powdery constituents used in the manufacture of cellular glass, heating the agglomerates to a preselected elevated temperature with or without cellulation occurring at this stage, and thereafter feeding the preheated agglomerates as a cohered plastic mass into a heating chamber on a suitable support.

A further object of this invention is to provide an improved process for conveying the constituents used to manufacture cellular glass across the heated surface of a material nonwettable by molten glass.

A still further object of this invention is to provide an improved process for cellulating the constituents used to manufacture cellular glass on a heated surface of a material nonwettable by molten glass where the physical properties of the cellular glass product are more easily controlled.

These and other objects and advantages of the invention will be more completely disclosed and described in the following specification, the accompanying drawings and the appended claims.

Throughout the specification and claims reference will be made to the powdery constituents used to make multicellular glass as finely ground glass and a finely divided carbonaceous material. The glass used may be conventional lime soda glass known as window glass, or a borosilicate glass as is disclosed in U.S. Pats. No. 2,123,536 and No. 2,691,248. It should be understood, however, that materials other than finely ground glass, when specially treated, may be used as either added constituents or in place of the finely ground glass. For example, materials such as fly ash and silica or admixtures thereof and metal oxides have in the past been cellulated to form a multicellular glassy material having properties similar to multicellular glass made from formulated glass. Inorganic materials other than finely ground formulated glass may therefore be used in the hereinafter described process, and it is not intended to limit the hereinafter described process to the use of finely ground formulated glass.

The cellulating agent may be any suitable material that reacts with another constituent of the admixture to form a gas at an elevated temperature where the glass has softened to form bubbles or cells within the softened admixture. A suitable cellulating agent comprises carbon in the form of lamp black, carbon black, finely divided coal, coke, silicon carbide or the like. It has been found, where finely divided carbon black is used, between 0.1 percent to 0.2 percent by weight is most suitable.

The terms "cellular glass" and "multicellular glass" will be used interchangeably throughout the specification to designate the product produced by the hereinafter described process. Multicellular glass has been previously described as an inorganic vitreous material composed of a multitude of cells separated from one another by thin glass walls or membranes. The vitreous material forms a continuous matrix so that the material contains a multitude of separate independent closed cells. The closed cells containing a gas provide many of the desirable properties of a multicellular glass. Sheets or blocks of multicellular glass are impermeable to water, resistant to fire, vermin and other agencies, have a low density and a low thermal conductivity and are useful as an insulating and/or building material. By choosing suitable densities it can be made load-bearing and used as a structural material.

In the drawings:

FIG. 1 is a block diagram of the various steps in my improved process.

FIG. 2 is a semidiagrammatic view of the process set forth in the block diagram of FIG. 1.

FIG. 3 is a semidiagrammatic view in vertical section illustrating the manner in which the hot pellets are agglomerated into a sheet and the sheet of agglomerated pellets is fed to the upper surface of a molten metal bath.

FIG. 4 is a semidiagrammatic view of a quantity of the pellets being discharged from the heating means.

FIG. 5 is a view similar to FIG. 4 illustrating the manner in which the hot pellets have been distorted by the spreader and compactor rolls on the feeding device to form a sheet of the agglomerated pellets.

FIG. 6 is a diagrammatical representation of the sheet of multicellular glass formed on the molten metal surface.

FIG. 7 is a semidiagrammatic view in vertical section similar to FIG. 3 illustrating the manner in which the hot pellets are agglomerated into a sheet and the sheet of agglomerated pellets is fed onto the upper surface of an endless belt that transports the sheet through a heating chamber.

FIG. 8 is a view in vertical section taken along the line 8—8 in FIG. 7.

FIG. 9 is a view in vertical section taken along the line 9—9 in FIG. 7.

Referring to the drawings and particularly FIGS. 1 and 2, my improved process includes the steps of first obtaining formulated glass particles, or other inorganic material suitable for cellulating, and a cellulating agent. The glass particles or other material and cellulating agent are admixed and ground to a fine powder. Agglomerates are thereafter formed from the powdered admixture. For example, the admixture may be fed, as is illustrated in FIG. 2, to a pellitizer where a liquid binder may be employed to form pellets of a preselected size. The pellets are preferably dried in a suitable drying means and are thereafter coated with a limited amount of a suitable parting agent such as $Al_2O_3$ or the like.

The pellets with the parting agent coating are thereafter heated to a temperature sufficient to soften and coalesce the pulverulent material in the pellets. It is desirable to heat the pellets to a sufficiently high temperature to partially liquefy the pulverulent material so that it has a viscosity of between $10^5$ to $10^7$ poises. The temperature at which the pulverulent material will soften and coalesce is dependent upon the composition of the glass particles or other inorganic material admixed with the cellulating agent. For example, where a conventional lime soda glass is used, heating the pellets to a temperature of between about 1500° F. and 2200° F. has been found suitable. Heating pellets of a conventional lime soda glass to a temperature of about 1700° F. is preferred.

The softened and partially cellulated pellets are withdrawn from the heating means and while in a softened state are compacted or compressed together so that the softened pellets are distorted from their substantially spherical shape and form a unitary mass, preferably in the form of a sheet. The sheet of agglomerated, partially cellulated pellets is thereafter fed into a heating chamber on a suitable support means where the pellets, agglomerated in a sheet, cellulate to form a continuous sheet of multicellular glass.

In one embodiment of my invention the sheet of agglomerated pellets is supported on the surface of a molten metal bath as it is conveyed through the heating chamber. During the cellulation process on the surface of the molten metal bath, the mass of agglomerated pellets is softened, the parting agent becomes admixed in the glass, the pellets lose their individual identity and form a single coherent mass of molten glass that continues to cellulate as it is heated. The ribbon or sheet of cellular glass is then annealed and cooled.

Where desired, the sheet of cellular glass may have a lower melting point glass enamel frit fused to its upper surface.

In another embodiment of my invention, the sheet of agglomerated pellets is positioned on a nonadhering surface of an endless belt that conveys the sheet of agglomerated pellets through a heating chamber where further cellulation occurs and a ribbon or sheet of multicellular glass is formed on the nonadhering surface of the endless metal belt.

Referring in greater detail to FIGS. 2 and 3, there is illustrated a bin 10 that contains a conventional lime soda glass that is used to produce glass containers or window glass. Bin 12 contains a cellulating agent, preferably a carbonaceous material such as carbon black and lamp black. The formulated glass from bin 10 and the cellulating agent from bin 12 are admixed in suitable proportions, for example, where carbon black is the cellulating agent, between 0.1 percent and 0.4 percent by weight of the cellulating agent is used and the remainder is formulated glass.

The admixture is thoroughly mixed in a combined mixer and comminuting device 14. The mixer and comminuting device 14 may be a conventional ball mill or the like. The admixture is comminuted, preferably to a size where about 95 percent of the admixture will pass through a 200 mesh Tyler Standard screen. The comminuted admixture is then pelletized in a suitable pelletizer 16. A binder such as a water solution containing about 1.3 percent sodium silicate by weight may be used during the pelletizing operation. It should be understood that the powdery admixture may be agglomerated into pellets or the like by other suitable means such as briquetting machines or the like. It is convenient, however, that the pellets have a spherical shape for use in the process.

The pellets formed in pelletizer 16 are thereafter dried in a suitable drier 18 until substantially all of the water is removed therefrom. A conventional oven at a temperature of between 250° F. and 300° F. has been found suitable to dry the pellets formed in pelletizer 16. The dried pellets may thereafter be coated with a parting agent such as $Al_2O_3$ in the form of a hydrate $Al_2O_3:3H_2O$. Other materials can also be used as a parting agent. It is, however, desirable to limit or control the amount of parting agent applied to the pellets. For example, where $Al_2O_3:3H_2O$ is used as the parting agent, about 0.0031 gram of $Al_2O_3:3H_2O$ per cm.$^2$ of surface area is used. An excess of parting agent on the pellets interferes to some extent with the agglomeration of the pellets and makes it more difficult to form a continuous foam structure during the heating period following the agglomeration of the pellets or partially cellulated nodules. The parting agent is applied to the outer surface of the pellets in a suitable device indicated by the numeral 20 which may be a rotating drum or the like.

The coated pellets are thereafter fed to a rotating cellulating furnace 22. The celullating furnace 22 is preferably a conventional rotating kiln that is heated by means of a burner or the like to heat the pellets therein to a sufficiently high temperature that the pellets soften and the powdery constituents cohere. It is believed that the limited amount of parting agent prevents the surface from becoming sticky for a long enough time to permit the interior of the pellets to become glassy and, if desired, to partially cellulate without causing the pellets to adhere to the walls of the rotating kiln or to each other. The surface of the pellets then becomes sticky so that after the heated pellets are discharged from the kiln and subjected to a compaction force, the pellets will distort, agglomerate and form a unitary mass or sheet.

A portion of the sodium silicate or other soluble material in the liquid binder used to agglomerate the pulverulent material in the pelletizer which migrates during the drying process toward the outer surface of the pellets, can combine with the parting agent to form a glass. I have discovered that there is sufficient time before this glassy layer forms to heat the pellets in a rotary kiln and, if desired, to partially cellulate them. The limited amount of the parting agent applied to the surface of the pellets at this elevated temperature is apparently sufficient to prevent the pellets from adhering to each other while they are moving. As the parting agent in the presence of the sodium silicate or other binder at this elevated temperature is converted into a glassy material and becomes admixed with the other glassy materials in the pellets, the formation of a continuous cellular structure becomes possible if the hot pellets or partially cellulated nodules come in contact with each other. It is preferred, however, to subject the sticky mass to a compaction step to aid in the production of a continuous sheet of cellular glass of specified thickness.

The pellets are preferably heated within the rotary kiln 22 at a cellulating temperature preferably chosen to bring the viscosity of the softened pulverulent material in the range of $10^5$ to $10^7$ poises. The pellets are heated for a sufficient period of time to cause the pellets to partially cellulate and soften. For example, when pellets containing pulverulent lime soda glass and having a diameter of between $\frac{1}{16}''$ and $\frac{1}{8}''$ are subjected to a cellulating temperature of about 1600° F. for a period of 15 minutes, the cellulation of the pellets is substantially complete. However, where the pellets of the previously described size are subjected to a temperature of 1600° F. for a shorter period of time as, for example, between 7 and 8 minutes, only partial cellulation occurs. A pellet increases in volume by a factor of 6 to 10 during the cellulation process. The pellets may be heated in the rotary kiln 22 to a cellulation temperature of about 1600° F. for a sufficient period of time to increase the volume of the pellets by a factor of 2 or 3.

The pellets at the elevated temperature are withdrawn from the rotary kiln 22 at a controlled rate through outlet 24 (FIG. 3) at a temperature of about 1600° F. The heated pellets are discharged onto a chute or receiver 26 fabricated of a material to which the heated pellets do not adhere, as for example a graphitic material. The chute or receiver 26 has a plurality of rollers 28, 30 and 32 positioned thereabove. The rollers 28, 30 and 32 may also be fabricated of a material to which molten glass does not adhere, for example a graphitic material. The rollers 28, 30 and 32 may also be continuously coated with a parting agent, as for example $Al_2O_3$ or the like, to prevent the heated pellets from adhering thereto. The rollers are utilized to spread, level and compact or agglomerate the heated pellets into a unitary sheet. The driven rollers convey the unitary sheet onto the upper surface of the molten metal bath or other means for controlled heat transfer. The rollers 28, 30 and 32 are spaced at different distances from the surface of the chute 26, as for example, if the distance between the outer periphery of roller 28 and the upper surface of chute 26 had a dimension of A, the distance between the outer periphery of roller compactor 30 from the upper surface of chute 26 would be about two-thirds of A and roller 32 would be spaced a distance of about one-half of A. With this arrangement the heated pellets discharged from rotary kiln 22 are subjected to successive compaction forces by the driven rollers 28, 30 and 32. Where desired, suitable heating means, as diagrammatically illustrated at 34, may be positioned beneath the chute or receiver 26 to minimize the heat loss in the pellets as they are conveyed and compacted into a unitary sheet.

FIGS. 4 and 5 illustrate the appearance of a mass of heated, partially cellulated pellets as they are discharged from the rotary kiln 22 and after they have been subjected to the compaction by rollers 28, 30 and 32. FIG. 4 clearly illustrates the substantially spherical pellets 40 that are in contiguous relation with adjacent pellets and have relatively small areas of contact, as is indicated by the numeral 42. There are substantial void spaces 44 between the contiguously positioned pellets 40. FIG. 5 illustrates how the soft, partially cellulated pellets have been distorted after a mass of the pellets are subjected to the compaction pressures of rollers 28, 30 and 32. The pellets 40 are distorted so that they are no longer spherical in shape and now have relatively large areas of contact. The larger areas of contact between the adjacent pellets, as indicated by the numeral 46, are effective in helping to prevent formation of reentrant angles which, if allowed to remain in the finished material, act as a source of weakness. It is important to obtain substantial adhesion between the nodules before they are completely cellulated. It has been discovered that the cellulation occurring after the nodules stick to each other further heals any reentrant angle that remains after the agglomeration. Without this elimination of reentrant angles within or at the surface of the cellular body, strong material cannot be obtained. It is preferred, however, to compact the sticky mass to aid in the elimination of reentrant angles and form a continuous sheet or cellular glass of specified thickness. As previously stated, the pellets 40 have been heated in the rotary kiln 22 to a sufficient degree to soften the constituents so that the pellets will cohere to each other. When the pellets are distorted, as illustrated in FIG. 5, a continuous sheet of the heated constituents used to make a sheet of cellular glass is formed therefrom. The rollers 28, 30 and 32 not only compact the heated pellets 40 into a continuous sheet but also feed the sheet onto the upper surface of the molten metal bath. The driven rollers, therefore, serve as the conveying means for the sheet of material as it is cellulated on the top surface of the molten metal bath.

The apparatus for cellulating the sheet of agglomerated pellets may be substantially the same as that disclosed in the copending applications Ser. No. 363,485 now Pat. No. 3,288,584 and Ser. No. 363,517 now Pat. No. 3,300,289 and the apparatus illustrated in South Africa Pat. No. 645,959. As is illustrated in FIG. 3, the heating chamber generally designated by the numeral 50 substantially the same as the heating chamber illustrated in application Ser. No. 363,485 now Pat. 3,288,584.

Within the chamber 50 there is a bath of molten metal 52 that has an upper horizontal surface 54. The molten metal bath is preferably tin or a tin alloy. Any suitable metal or alloy that serves in a molten state as a suitable heat exchange media and does not adhere to the molten glass may be used. The chamber 50 has an upper portion 56 that covers the molten glass upper surface 54. Tubes 58 are provided within the chamber 50 to supply nitrogen, carbon dioxide, a mixture of carbon dioxide and carbon monoxide and other inert or reducing gas to the internal portion thereof so that a substantially nonoxidizing or controlled atmosphere is maintained above the upper surface of the molten metal bath 52.

The molten metal bath 52 is heated by a plurality of heating elements 60 extending laterally through and submerged in the bath 52. There are other heating elements 62 mounted above the molten metal bath top surface 54 to supply heat to the internal portion of chamber 50. Any suitable heating means may be employed to supply heat to the molten metal bath and to the chamber 50.

The sheet of heated agglomerated pellets or, where desired, partially cellulated nodules 40 is conveyed to the top surface 54 of molten metal bath 52 by means of the rollers 28, 30 and 32. The sheet of agglomerated pellets 40 is at an elevated temperature, the exact temperature being dependent on the composition of the glass and varying from 1600° F. to 2200° F., as it is conveyed into heat exchange relation with the upper surface of the molten metal bath 52. The length of the molten metal bath 52 and the time necessary for the glassy material to be in heat exchange relation are substantially reduced by preheating the glassy material before it is fed onto the surface of the molten metal bath 52.

Although not illustrated in FIG. 3, there are provided pairs of guides or curbs formed of a material nonwettable by molten glass along the sides of the chamber 50 adjacent the upper surface 54 of the molten metal bath 52. The guides are arranged to extend along the side walls of the chamber 50 and thereby provide a relatively frictionless surface against which the sheet of glassy material may abut as it is conveyed through the chamber 50.

The agglomerated sheet of pellets or partially cellulated modules generally designated by the numeral 64 is in heat exchange relation with the molten metal bath 52 as it is conveyed along the upper surface 54 thereof. As the sheet 64 is conveyed through the chamber 50 by the driven rollers 28, 30 and 32, the sheet 64 is further heated by the molten metal bath. Heat of radiation supplied by the heating elements 62 increases the temperature of the upper or top surface of sheet 64 as it is conveyed across th top surface 54 of the molten metal bath 52. The sheet 64 is heated as it is conveyed on the top surface of the molten metal bath and the vitreous material further softens and the cellulating agent reacts to form bubbles of gas in the coalesced admixture to thereby form a sheet of multicellular glass.

The continuous sheet of multicellular glass undergoes a certain hardening or rigidification as it progresses toward the outlet portion of chamber 50. Cooling elements 66 extend laterally across the chamber 50 to accelerate the hardening or rigidification of the sheet 64 after it has cellulated. There are also provided rollers 68, 70 and 72 that are arranged to cool the upper surface of the multicellular glass sheet as it is conveyed thereunder. The upper surface of the multicellular glass sheet is further leveled by the rollers 68, 70 and 72 to form a smooth surface thereon. Preferably the rollers 68, 70 and 72 are fabricated of a material that is nonwettable by molten glass as, for example, graphitic material or the like. A continuous flexible alloy steel belt coated with a parting agent, for example $Al_2O_3$, or a continuous wire mesh belt also coated with a parting agent such as $Al_2O_3$ can be used for this leveling operation instead of the rolls shown.

Connected in series with the heating chamber 50 is a cooling chamber or lehr 74. The sheet of multicellular glass is cooled in the chamber 74 at a controlled rate. As the sheet of multicellular glass passes beneath the rollers 68, 70 and 72 it is cooled sufficiently to be further transported from the heating chamber 50 to the cooling chamber 74. The rigidified sheet of multicellular glass is conveyed from the heating chamber 50 over an intermediate roller 76 into the cooling or annealing chamber 74. The sheet of multicellular glass is supported in the cooling chamber 74 by means of a plurality of rollers 78 and the sheet of multicellular glass as it proceeds through the cooling chamber 74 is gradually cooled and hardened. The hardened sheet of multicellular glass is then withdrawn from the end portion of cooling chamber 74 and thereafter cut transversely into blocks of a preselected dimension.

If a cellulated sheet of substantial thickness (3" to 6", for example) is desired, the cooling or annealing time may become so long that cooling as discussed above will require an uneconomically long cooling zone. In this case the cellulated material can be cooled just enough to make it rigid enough for cutting (about 25° F. to 100° F. above the annealing temperature) at which temperature it can be cut into pieces of suitable length and the pieces can be upended and transported through the lehr in a vertical position.

Where desired, a coating of a lower melting point glass or an enamel frit or the like may be deposited on the upper surface of the multicellular glass sheet either before or after it has been rigidified by the cooling rollers 68, 70 and 72. For example, there is illustrated in FIG. 3 a distributor 80 positioned above the intermediate roller 76. A powdery mixture of a glass having a lower melting point than the constituents of the multicellular glass, or an enamel frit, may be supplied through the distributor 80 onto the upper surface of the multicellular glass sheet. A radiant heating means diagrammatically indicated at 82 as an open flame may be provided to fuse the lower melting point glass or the enamel frit to the surface of the multicellular glass sheet. The enamel may be clear, opaque, white or colored, as desired. The radiant heater should be such that a minimum amount of heat is transferred to the multicellular glass sheet. Only enough radiant heat is required to fuse and fire polish the enamel frit of lower melting point glass to the upper surface of the multicellular glass sheet.

Although not illustrated, it is within the scope of this invention to deposit the sheet 64 of agglomerated pellets 40 onto the upper surface of a glass sheet. Application Ser. No. 363,517 now U.S. Pat. No. 3,300,289 and the South Africa Pat. No. 645,959 describe a process wherein powdery constituents used in the manufacture of multicellular glass are deposited on a surface of a glass sheet that is being conveyed on the upper surface of a molten metal bath. The sheet 64 of agglomerated pellets or partially cellulated nodules 40 may with equal facility be deposited on a surface of a glass sheet that is in heat exchange relation with the upper surface of a molten metal bath. Where, as previously described, the sheet of agglomerated pellets 40 is heated to the cellulating temperature of the admixture, the problem of heat transfer through the sheet of glass positioned on the upper surface of the molten metal bath is substantially reduced and less heat is thereafter required to both fuse the sheet of multicellular glass to the glass sheet and to cellulate the sheet of multicellular glass.

It will be apparent from the above description of my invention that the process of cotninuously cellulating glass on a surface of a molten metal bath is improved substantially in that less heat transfer is required from the molten metal bath to the material that is to be cellulated by the above described process. A positive means is now provided for conveying the material through the heating chamber. The processes described in the pending applications and in the South Africa patent deposit a powdery material onto the upper surface of the molten metal bath. This powdery material must remain in a relatively static condition until it is sufficiently heated to soften and coalesce. A substantial amount of heat is required to bring the temperature of the powdery material to the point where the material softens and coalesces into a unitary sheet. With the herein above described process the powdery material has been formed into pellets which have been heated to a cellulating temperature and are agglomerated into a unitary sheet. The sheet is positively conveyed onto the top surface of the molten metal bath and the rate at which the sheet is conveyed through the heating chamber 50 may be accurately and easily controlled by the driven rollers.

Also, where it is desired to vary the thickness of the sheet, the output from the rotary kiln 22 may be controlled and the driven rollers 28, 30 and 32 moved either closer or further away from the chute or receiver 26. Further, where it is desired to make a high density multicellular glass, the degree of cellulation imparted to the sheet within the heating chamber 50 may be easily controlled by the rate at which the sheet is driven through the cellulating zone.

FIGS. 7, 8 and 9 illustrate an endless movable metal belt for conveying the sheet of agglomerated, partially cellulated pellets through a heating chamber. The pellets are fed from a suitable hopper or receiver 100 to a rotating cellulating furnace 102 where the pellets are sufficiently heated, as previously described, to cause the pellets to soften, coalesce and partially cellulate. The heated pellets are discharged from the rotary kiln 102 onto a chute or receiver 104 fabricated of a material to which the heated pellets do not adhere, as for example a graphitic material. Rollers 106, 108 and 110 are positioned above the chute 104 and perform substantially the same functions as rollers 28, 30 and 32 previously described with reference to FIG. 3. Positioned beneath the chute 104 is an endless metal belt 112 reeved about end rollers 114 and 116. Rollers 118, 120 and 122 are provided to propel the endless belt 112 and to take up any expansion and contraction of the endless belt 112 due to the elevated temperature wtihin the heating chamber generally designated by the numeral 124. The upper surface of belt 112 is preferably coated with a parting agent such as $Al_2O_3$ or the like by means of a distributor designated by the numeral 126 positioned adjacent the chute 104. Coating the surface of the belt 112 with the parting agent provides a nonadhering surface for belt 112 on which the sheet 176 of agglomerated, partially cellulated pellets is positioned. In lieu of the parting agent a release paper such as asbestos or the like may be positioned on the upper surface of belt 112 before the sheet of agglomerated pellets is positioned thereon. It should be understood, however, any suitable means may be employed to prevent the molten material from adhering to the metal belt 112 during the cellulation process.

The heating chamber generally designated by the numeral 124 has a refractory shell 128. There is positioned within the chamber 124 a muffle chamber 130 that has openings 132 and 134. The muffle chamber 130 extends longitudinally through the heating chamber 124 and encircles the endless metal belt 112. The endless metal belt 112 extends through the muffle chamber 130 and is suitably supported therein on rolls 136 to provide a relatively flat surface for the sheet of agglomerated cellular pellets. The heaating chamber 124 has a plurality of firing chambers 138 separated from each other by walls 140. Suitable burners 142 are positioned in the firing chambers to heat the muffle chamber 130 to the desired temperature. There are provided suitable exhaust openings 144 in the chambers 138 for the withdrawal of the products of combustion therefrom. The chambers 138 have air inlet openings 146 with dampers 148 to control the flow of combustion air from passageway 150 positioned below the chambers 138. With this arrangement, the sheet of agglomerated pellets is isolated from the products of combustion by means of the muffle chamber 130 so that the material within the muffle chamber 130 is heated substantially by radiation. A suitable means is provided, as for example conduit 152 within muffle chamber 130, to supply nitrogen, carbon dioxide, a mixture of carbon dioxide and carbon monoxide or other inert or reducing gas thereto so that a substantially nonoxidizing or controlled reducing atmosphere is maintained within muffle chamber 130.

Within the muffle chamber 130 there are a pair of elongated guides 154 positioned in abutting relation with the upper surface of the metal belt 112. The guides 154 may be elongated strips fabricated of a graphitic material to which the molten glass does not adhere. The guides 154 serve as means to retain the sheet of agglomerated pellets within the boundaries of the belt 112 during the further cellulation within the muffle chamber 130. It should understood that any suitable means to maintain the sheet of agglomerated pellets on the metal belt 112 during the cellulation process within the muffle chamber 130 may be used, as for example vertical endless metal belts may be substituted for the graphitic guides 154. The metal belt 112 may be frabricated with hinged edge portions that are turned upwardly to a vertical position to retain the sheet of agglomerated pellets thereon.

Connected to the heating chamber 124 is an annealing or cooling chamber 156 that has a shell 158 with a plurality of cooling chambers 162 with suitable upper and lower inlet and outlet openings 164 and 166 through which a cooling medium is circulated to cool the endless sheet of multicellular glass 168 in a conventional manner. By means of the upper and lower inlets and outlets for the cooling medium the temperature adjacent the upper and lower portions of the cooling chamber 156 may be separately controlled to provide the desired rate of cooling for the upper and lower surfaces of the sheet of multicellular glass 168. The heating chamber 124 and cooling chamber 126 are connected by an intermediate chamber 170 which has an outlet opening 172 through which the heated inert or reducing gases are withdrawn from the muffle chamber 130. Within the cooling chamber 156 the endless sheet of multicellular glass 168 after it has sufficiently cooled and rigidified is discharged off the endless belt 112 and is supported by rollers 174 at spaced suitable distances from each other.

With the apparatus illustrated in FIGS. 7, 8 and 9, the heated pellets form an agglomerated sheet 176 beneath the rollers 106, 108 and 110. The sheet of agglomerated pellets 176 is transferred from the chute 104 onto the upper surface of the endless belt 112. The endless belt 112 is moving in the direction of the arrows illustrated in FIG. 7 and conveys the sheet of agglomerated pellets 176 into the muffle chamber 130 of the heating chamber 124. The endless belt 112 moves through the muffle chamber 130 at a controlled rate to permit the heated sheet of agglomerated pellets 176 to further cellulate and form an endless sheet of multicellular glass 168. Positioned within the muffle chamber 130 are a plurality of rollers 178, 180 and 182 which are arranged to compact the sheet of multicellular glass to the desired density and to provide a relatively smooth, flat, upper surface thereto, as is illustrated in FIG. 9. The sheet of multicellular glass 168 is transported by means of the endless belt 112 through the heating chamber 124, the intermediate pasageway 170 and into the cooling chamber 156 where the relatively soft sheet of multicellular glass 168 is permitted to rigidify. After the sheet of multicellular glass has rigidified, it is transferred from the endless metal belt 112 onto suitable supporting rollers 174. After cooling, the sheet is transported out of the cooling chamber 156 for further processing.

As previously stated, where desired, the length of the cooling or annealing period may be reduced by first cooling the cellulated sheet to a temperature where it is sufficiently rigid to be cut by conventional cutting means, upending the cut blocks or segments of multicellular glass and then slowly transporting the upended segments through the cooling or annealing chamber. The cutting and upending of the segments or blocks reduces substantially the length of the cooling chamber.

It will be apparent with the above description of the apparatus illustrated in FIGS. 7, 8 and 9 that it is now possible to continuously cellulate glass on a surface of a moving metal belt. The rate at which the sheet of agglomerated pellets is transported through the heating chamber may be easily controlled and, because the sheet of agglomerated pellets is fed onto the endless belt 112 at an elevated temperature closely approximating the cellulating temperature, the length of the heating chamber and the time required to form an endless sheet of multicellular glass are substantially reduced. As previously described, the thickness and density of the multicellular glass sheet may be easily controlled by the rate at which the sheet is transported through the heating chamber 124.

According to the provisions of the patent statutes, I have explained the principle, preferred construction, and mode of operation of my invention and have illustrated and described what I now consider to represent its best embodiments. However, I desire to have it understood that, within the scope of the appended claims, the invention may be practiced otherwise than as specifically illustrated and described.

I claim:

1. A method of making a unitary mass of cellular material comprising the steps of,
    forming an admixture of a pulverulent material and a cellulating agent,
    agglomerating said admixture into discrete shaped agglomerates,
    heating said discrete agglomerates sufficiently to cause said admixture to soften, coalesce and partially cellulate, and to cause said heated partially cellulated agglomerates to adhere to each other,
    forming a body of said partially cellulated discrete agglomerates by the adhesion of said heated partially cellulated agglomerates to each other, and
    thereafter heating said body of partially cellulated agglomerates sufficiently to cause said admixture to increase in volume by further cellulation and form a unitary mass of cellular material.

2. A method of making a unitary mass of cellular material as set forth in claim 1 which includes,
    distorting said partially cellulated agglomerates in said body to increase the adhesion between adjacent agglomerates.

3. A method of making a unitary mass of cellular material as set forth in claim 1 which includes,
    continuously advancing sad body over a nonadhering support, and
    heating said body while advancing over said nonadhering support sufficiently to cause said admixture to increase in volume by cellulation and form a unitary mass of cellular material.

4. A method of making a unitary mass of cellular material comprising the steps of,
    forming an admixture of a pulverulent material and a cellulating agent,
    agglomerating said admixture into discrete shaped agglomerates,
    heating said discrete agglomerates sufficiently to cause said agglomerates to adhere to each other,
    forming a body of said discrete agglomerates by the adhesion of said heated agglomerates to each other,
    positioning said body on a surface of a molten metal bath,
    advancing said body along the surface of said molten metal bath at a controlled rate, and
    heating said body while advancing over said molten metal bath surface sufficiently to cause said admixture to increase in volume by cellulation and form a unitary mass of cellular material.

5. A process for making a unitary mass of cellular glass comprising the steps of,
    forming an admixture of pulverulent glassy material and a cellulating agent,
    agglomerating said admixture into discrete pellets,
    heating said discrete pellets sufficiently to cause said admixture in said pellets to soften, coalesce and partially cellulate to form soft partially cellulated nodules,
    continuously agitating said discrete pellets during heating while forming said partially cellulated nodules,
    forming a body of said soft partially cellulated nodules,
    distorting said soft partially cellulated nodules in said body to reduce the void spaces between adjacent partially cellulated nodules, and
    thereafter heating said body of partially cellulated nodules sufficiently to cause said nodules to increase in volume by further cellulation and form a unitary mass of cellulated glass.

6. A process for making cellular glass as set forth in claim 5 which includes,
    coating the surface of said pellets with a sufficient amount of a parting agent to prevent adhesion of said pellets while said pellets are being agitated and moving relative to each other during heating and partial cellulation,
    heating said coated pellets under conditions of continuous agitation in a rotating retort for a sufficient period of time to cause said admixture in said pellets to soften, coalesce and partially cellulate to form soft partially cellulated nodules,
    withdrawing said soft partially cellulated nodules from said rotating retort,
    maintaining said soft partially cellulated nodules relatively quiescent relative to adjacent nodules and forming a body of said soft partially cellulated nodules, said coating of parting agent on said nodules being insufficient to prevent adhesion between said adjacent nodules while in a relatively quiescent state.

7. A process for making cellular glass as set forth in claim 5 which includes,
    positioning said body on a support having a nonadhering surface,
    moving said support through a heating chamber at a controlled rate to cause said nodules to further cellulate and form a unitary mass of cellulated glass, and
    removing said mass of cellulated glass from said support nonadhering surface.

8. A process for making cellular glass as set forth in claim 5 which includes,
    continuously advancing said body over a nonadhering support, and
    heating said body while advancing over said support sufficiently to cause said partially cellulated nodules to increase in volume by further cellulation and form a unitary mass of cellular material.

9. A continuous process for making a sheet of cellular glass comprising the steps of,
    forming an admixture of pulverulent glassy material and a cellulating agent,
    agglomerating said admixture into discrete pellets,
    coating the surface of said pellets with a sufficient amount of a parting agent to prevent adhesion of said pellets while said pellets are being agitated and moving relative to each other during heating and partial cellulation,
    heating said coated pellets under conditions of continuous agitation in a rotating retort for a sufficient period of time to cause said admixture in said pellets to soften, coalesce, and partially cellulate to form partially cellulated nodules,
    withdrawing said soft partially cellulated nodules from said rotating retort,
    maintaining said soft partially cellulated nodules relatively quiescent relative to adjacent nodules and forming a sheet of said soft partially cellulated nodules, said coating of parting agent on said nodules being insufficient to prevent adhesion between said adjacent nodules while in a relatively quiescent state,
    distorting said soft partially cellulated nodules in said sheet to reduce the void spaces between said adjacent partially cellulated nodules, advancing said sheet of partially cellulated nodules onto a nonadhering surface of an endless metal belt, moving said endless metal belt with said sheet positioned thereon through a heating chamber at a controlled rate to cause said partially cellulated nodules to increase in volume by further cellulation and form a continuous sheet of cellular glass, and removing said sheet of cellular glass from said nonadhering surface of said endless metal belt.

10. A continuous process for making a sheet of cellular glass comprising the steps of, forming an admixture of pulverulent glassy material and a cellulating agent, agglomerating said admixture into discrete pellets, coating the surface of said pellets with a sufficient amount of a parting agent to prevent adhesion of said pellets while said pellets are being agitated and moving relative to each other during heating and partial cellulation, heating said coated pellets under conditions of continuous agitation in a rotating retort for a sufficient period of time to cause said admixture in said pellets to soften, coalesce, and partially cellulate to form partially cellulated nodules, withdrawing said soft partially cellulated nodules from said rotating retort, maintaining said soft partially cellulated nodules relatively quiescent relative to adjacent nodules and forming a sheet of said soft partially cellulated nodules, said coating of parting agent on said nodules being insufficient to prevent adhesion between said adjacent nodules while in a relatively quiescent state, distorting said soft partially cellulated nodules in said sheet to reduce the void spaces between said adjacent partially cellulated nodules, passing said sheet of partially cellulated nodules into a heating chamber and supporting said sheet on a surface of a molten metal bath, advancing said sheet along the surface of said molten metal bath at a controlled rate, and heating said sheet while advancing over said molten metal bath surface sufficiently to cause said partially cellulated nodules to increase in volume by further cellulation and form a continuous sheet of cellular glass.

References Cited

UNITED STATES PATENTS

| | | | |
|---|---|---|---|
| 2,377,076 | 5/1945 | Ford | 65—22 X |
| 3,207,588 | 9/1965 | Slayter et al. | 65—22 X |
| 3,325,341 | 6/1967 | Shannon | 65—22 X |
| 3,361,550 | 1/1968 | Murphy et al. | 65—22 |

ARTHUR D. KELLOGG, Primary Examiner

U.S. Cl. X.R.

65—21, 22